United States Patent [19]

Gelbman

[11] 3,853,571
[45] Dec. 10, 1974

[54] FIRE RESISTANT COMPOSITION CONTAINING GYPSUM AND SILICATE-BASED MATERIAL AND PROCESSS FOR MAKING SAME

[76] Inventor: Lawrence F. Gelbman, 86 Hamilton Ave., Yonkers, N.Y. 10705

[22] Filed: Oct. 5, 1972

[21] Appl. No.: 295,170

[52] U.S. Cl. ............................... 106/105, 106/109
[51] Int. Cl. ...................... C04b 7/00, C04b 11/00
[58] Field of Search.................... 106/75, 109, 40 R

[56] References Cited
UNITED STATES PATENTS

| | | | |
|---|---|---|---|
| 2,117,605 | 5/1938 | Fowler et al. | 106/75 |
| 2,978,340 | 4/1961 | Veatch et al. | 106/75 |
| 3,369,929 | 2/1968 | Petersen | 106/109 |
| 3,376,147 | 4/1968 | Dean | 106/109 |
| 3,450,547 | 6/1969 | Sams et al. | 106/75 |
| 3,719,510 | 3/1973 | Temple et al. | 106/75 |

*Primary Examiner*—J. Poer
*Attorney, Agent, or Firm*—Bryan, Parmelee, Johnson & Bollinger

[57] ABSTRACT

Fire-resistant compositions comprising gypsum or gypsum and magnesium oxysulfate and a synthetic material including a processed mixture of anhydrous sodium silicate, liquid sodium silicate and a heat triggered neutralizer such as boric acid. If desired, a bulk density modifier such as Portland cement may be added. The fire-resistant compositions may be fabricated into construction elements such as wallboard, soundproofing panels and thermal insulation or applied as a spray to provide furnace linings, fireproofing coating layers on girders and the like.

4 Claims, No Drawings

FIRE RESISTANT COMPOSITION CONTAINING GYPSUM AND SILICATE-BASED MATERIAL AND PROCESSS FOR MAKING SAME

This invention relates to novel fire-resistant compositions containing gypsum or gypsum and magnesium oxysulfate and silicate-based material suitable for use in construction elements and components such as wallboard, thermal insulation, soundproofing panels, fireproofing coating layers, furnace linings and other building products as well as providing industrial fire-resistant materials and the like. More particularly, the present invention is directed to fire-resistant compositions comprising a gypsum or gypsum and magnesium oxysulfate binder material and a silicate-based synthetic material which are mixed together to form the new composition, that can be used to produce construction components displaying unique structural integrity under adverse heat or fire conditions.

According to the present invention the natural-occurring material gypsum, which is commonly used in the fabrication of construction elements such as wallboard, is combined with a synthetic silicate-based particulate material comprising a processed mixture of anhydrous sodium silicate, liquid sodium silicate and a heat-triggered neutralizer material such as boric acid to produce a commposition having extraordinary fire-resistant characteristics. Advantageously, magnesium oxysulfate can be combined with the gypsum as a binder for the synthetic aggregate. These new compositions exhivit several important advantages for use in construction operations and industrial applications.

The synthetic silicate-based material is that which has been processed to form an expanded lightweight particulate material, as described and claimed in my copending patent application, Ser. No. 81,037, filed Oct. 15, 1970, now U.S. Pat. No. 3,765,919. This expanded lightweight silicate material is useful in lightweight construction and in packaging components and the like. If desired, the synthetic material may contain a bulk density modifier such as Portland cement, as described and claimed in said patent application.

Gypsum, although it is commonly utilized in the prior art as the component for fabrication of construction materials such as wallboard and in gypsum blocks for use as partitions and walls, has little ability to withstand fire or severe heat conditions. Many building codes require that construction materials be able to withstand fire and retard heat transmission to a certain extent. Commonly recognized set of criteria are the so-called "Two-Hour" and "Four-Hour" fire ratings of the New York City Board of Standards and Appeals. For example, a Two-Hour rating requires that the temperature on one side of a partition wall or the like does not rise to 250°F above ambient temperature within 2 hours while the other side is being continuously exposed to intense heat and/or flames. That is, the 250° temperature rise must not be reached on the non-exposed side before 2 hours in order to comply with the code.

Generally, in order for prior art gypsum wallboards to be able to obtain such a Two-Hour fire rating, a studded wall system comprising two pairs of ⅝ inch thick gypsum boards are used. One pair of prior art gypsum boards are located on each side of steel studs spaced 16 inches center to center in a wall meeting this rating. In other words, the total thickness of the prior art gypsum wallboard in such a studded wall is 1 ¼ inch on each side plus the central dead air space of approximately 3 ½ inches which also aids the wallboard in retarding heat transfer, making an overall thickness of approximately 6 inches.

In marked contrast to such prior art performance, wallboards utilizing the gypsum-synthetic aggregate compositions of the present invention have exceeded a fire rating of nearly 5 Hours while using merely boards of 1 inch thickness spaced 1 inch apart. Thus, the present invention provides more than a 100 percent increase in time duration of fire resistance with a lesser thickness of wallboard and an overall thickness of only 3 inches as compared to the overall thickness of 6 inches of the prior art wallboard constructions. This is an increase in fire endurance greater than 100 percent while using only one-half as much overall thickness of wall construction. Yet such enhanced fire resistance is not achieved at the expense of other desirable properties since humidity tests on wallboards made from the gypsum binder-synthetic aggregate compositions of the invention demonstrate that the boards possess the same excellent dimensional stability under humidity changes as does gypsum.

An object of the present invention therefore is the provision of gypsum-containing construction and industrial use compositions having vastly enhanced fire-resistant and heat transmission retardant properties compared to prior art gypsum construction materials.

Another object of the present invention is to provide more efficient utilization of gypsum construction materials in buildings by reducing the weight of walls, partitions and ceilings while greatly exceeding the fire-resistant and fire retardant characteristics of the prior art buildings using gypsum materials.

A further object of the present invention is to provide novel compositions having numerous advantages for use in construction and industry.

Upon exposure to heat ordinary gypsum will transform to a white powder, commonly known as plaster of Paris, since the $CaSO_4 \cdot 2H_2O$ loses some water of hydration at about 262° F to become $CaSO_4 \cdot \frac{1}{2}H_2O$. The anhydrite form is reached at about 326° F. It is generally known that when gypsum is heated to a high enough temperature, i.e., in the range of 400°–450° F, it loses its structural integrity and crumbles. In striking contrast, the compositions of the present invention, synthetic silicate-based material mixed with gypsum, or gypsum and magnesium oxysulfate when subjected to high temperatures and heating actually gains in strength and structural integrity rather than crumbling. Thus, any construction material utilizing these compositions will become stronger under adverse heat conditions rather than weaker as occurs with the present prior art materials of construction.

A further feature of this invention, therefore, is the provision of compositions which gain in structural integrity when subjected to high heat and therefore are useful particularly in walls, ceilings other building components such as thermal insulation which desirably withstand destruction, for safety and other reasons when subjected to high heat such as is generated by a fire in a building.

The silicate-based aggregate used in the compositions of this invention has preferably undergone an expansion during its processing so that an extremely lightweight and low density material is obtained. This density is controllable by the addition of a bulk density modifier such as Portland cement, as explained in said prior co-pending application.

Thus, an advantage of this invention is the provision of compositions for use in construction and industry available in a variety of densities rendering it suitable for many uses ranging from lightweight materials to medium density materials.

Gypsum is the binder perferred for wallboard because of one or more of its desirable properties of quick setting time, lightweight, dimensional stability under humidity changes and economy. However, in construction application the foregoing properties do not constitute important factors binder selection may be made primarily on the basis of fire rating. For example, in the fireproofing of steel beams primary consideration may be given to fire resistance of the binder. Thus, I have found that binders such as magnesium oxychloride and magnesium oxysulfate yield excellent results in combination with the synthetic aggregate. A combination of gypsum and magnesium oxysulfate with the synthetic aggregate yields excellent fire resistance while displaying the integrity under humidity changes exhibited by gypsum and synthetic aggregate.

The composition according to the present invention may be mixed with water and sprayed onto an object which it is desired to coat. For example, this novel composition appears to me at this time to be highly suitable as a furnace lining or refractory that may be sprayed (in "Gunite" spray manner) directly onto the furnace interior and then heated to provide high strength and integrity in situ. This direct spray application of the refractory-forming composition in a few hours represents a tremendous saving in labor as compared to the prior art in which refractory lining material is applied to the interior of a furnace in a brick-by-brick installation process which often takes weeks of time.

An additional advantage of this invention, therefore, is the provision that a fire-resistant refractory-forming composition which may be applied directly to an object by spraying thereon as a slurry.

Another object of the present invention is the provision of a process for producing a fire-resistant composition comprising a mixture of gypsum or gypsum and magnesium oxysulfate and a processed silicate-based synthetic material.

A further feature of this invention is the provision of a fire-resistant composition comprising gypsum or gypsum and magnesium oxysulfate and a silicate-based synthetic aggregate material and possessing unusually good heat transmission retardant properties and being suitable for use in construction components such as wallboard, thermal insulation panels, sound insulation panels and other soundproofing and fireproofing applications such as steel column and beam protective coverings, as well as use in industrial and miscellaneous applications such as furnace linings and the like, which composition has a highly stable structural integrity under adverse heat conditions.

Other features and advantages and objects of the present invention will be more readily understood and become apparent from a consideration of the following description of embodiments of the invention and examples thereof.

Gypsum in commercially obtainable form is mixed with silicate-based synthetic particulate material by conventional mechanical means, such as cement mixer.

The silicate-based synthetic aggregate material is readily produced by following the procedure described in my co-pending patent application, Ser. No. 81,037, filed Oct. 15, 1970, now U.S. Pat. No. 3,765,919 and entitled "Synthetic Lightweight Material and Process and System For Manufacturing Same." Described in the disclosure of that application, the entirety of which is incorporated by reference herein, is the production of a lightweight synthetic particulate material, such as aggregate, for use in building and construction and the like comprising, in varying proportions, anhydrous sodium silicate, liquid sodium silicate, a heat-triggered neutralizer such as granular boric acid and optionally an expander controller for selection of bulk densities, such as Portland cement. The components are mixed thoroughly and processed in a manner including the application of heat to obtain expansion of the material into a lightweight aggregate suitable for building and construction uses. The bulk density of the synthetic particles so produced may vary according to the presence of Portland cement and if such is not used to control density, it may have a bulk density of less than about 1.5 pounds per cubic foot. Synthetic particle sizes useable in the present invention range from fine particles to particles one-quarter inch in diameter or even larger. Bulk densities may range from 1.4 to 6 pounds per cubic foot.

The resulting mixture of gypsum and synthetic silicate-based material can conveniently be made into wallboard by adding water and applying in sandwich fashion between surface layers of conventional wallboard facings (i.e., paper). If desired, the novel composition of the present invention can be converted into a hard refractory-like material by heating it in an appropriate manner, as in a muffle furnace, to a temperature and for a length of time such that the resulting heat-treated composition is insoluble in water. Generally, this will be at a temperature above 1,200° F and preferably in the range between 1,200° F and 2,000° F. This heating assures that the composition will display stable structural integrity under subsequent adverse heating conditions so that even when later subjected to temperatures as high as 2,000° F the material will not change in form. This performance is to be contrasted with gypsum alone which when subjected to temperatures between 400° and 450° F it crumbles and disintegrates to a powder.

The precise mechanism by which gypsum alone loses its structural integrity and disintegrates to powder upon heating above approximately 400° F is unknown. Nor have I been able to determine the chemical action or mechanism taking place between the gypsum and the synthetic silicate-based material mixed together in the composition according to my invention, when this novel composition is heated to a temperature above approximately 400° F. However, although the theory as to the exact manner which the components interact is unknown, it is clear that an enhanced stability and structural integrity is obtained and that the composition withstands high temperatures and heat without disintegrating to powder. Therefore, the novel composition will be defined, as is commonly done in this art, by the relative proportions of the constituents going to make it up. Such definition, however, is intended for convenience only and includes compositions having the specified makeup in components and proportions regardless of how or by what mechanism they may actually be bound together.

For fireproofing steel, such as beams and girders, binders other than gypsum may be used provided that they display properties of enhanced fire resistance. A composition of magnesium oxychloride and the synthetic aggregate has yielded excellent results, better than gypsum, Portland cement, Luminate cement or combinations of these. However, under the heat of fire the magnesium oxychloride liberates chlorine which is objectionable. Thus, magnesium oxysulfate is preferred to use in place of magnesium oxychloride and I have found it to perform successfully in combination with the synthetic aggregate as a fire retardant. Both magnesium oxychloride and magnesium oxysulfate are obtained by known methods and are available commercially.

Magnesium oxysulfate in combination with the synthetic aggregate while yielding excellent fire resistance nevertheless does not possess the integrity necessary in all situations. Under high relative humidity or under cycling changes in relative humidity, magnesium oxysulfate tends to powder and lose strength. I have found that these disadvantages may be overcome by combining magnesium oxysulfate and gypsum for use as a binder for the synthetic aggregate. This composition gives the excellent fire ratings achievable with magnesium oxysulfate as well as resistance to adverse effects occasioned by humidity changes. The fact that magnesium oxysulfate is heavier and slower setting than gypsum similarly as used is no drawback in uses such as fireproofing of steel beams and the like.

Not only do the compositions of this invention retain their structural integrity under conditions where prior construction material used for the same purposes did not, but, moreover, they have increased fire-resistance and heat transmission-retardance as will be subsequently detailed.

Depending on the end use intended for the compositions of this invention the silicate aggregate portion may be lightweight to extreme low density such as below 1.5 pounds per cubic foot. This is advantageous when the composition is to be used solely for partition, wallboard ceiling or insulation material. If the composition is to be used for load-bearing structure, Portland cement may be added to the synthetic aggregate material prior to its processing thus controlling its bulk density and giving a heavier material, as heavy as 6 pounds per cubic foot.

The following examples are illustrative of the invention. All proportions given herein are by volume, unless specifically noted otherwise:

EXAMPLE 1

One part gypsum was mechanically mixed with one part particulate synthetic material comprising a processed mixture of anhydrous sodium silicate, liquid sodium silicate and boric acid. Then water was added to the mixture while continuing the mechanical mixture. Sufficient water was added to render the wetted composition workable and spreadable. The wet composition was spread between pairs of conventional wallboard facings which were held flat while the composition dried to form rigid wall boards ⅝ inch thick. This wallboard was built into a wall section having a pair of such wallboards spaced by 2 ¾ of an inch, making a total overall wall thickness of 4 inches. This wall section was subjected on one face to intense heating by direct and continuous exposure to heat in a furnace. The other side of the wall remained at a temperature less than 250° F above the ambient temperature of 80° F for over 3 hours. This wall section retained its structural integrity during the entire heating time. When this wall section was allowed to cool down to room temperature, the wall board on the heated side was found to have greater strength than conventional prior art gypsum wallboard ⅝ inch thick.

EXAMPLE 2

One part gypsum was mechanically mixed with one part particulate synthetic material comprising a processed mixture of anhydrous sodium silicate, liquid sodium silicate and boric acid and then sufficient water was added while continuing the mixing such that the gypsum in the wetted mixture acted as a binder bar binding together the synthetic particles in a workable, moldable mass was cast into a solid block. The solid block of this composition was placed in a muffle furnace and subjected to high temperature. The resulting heat-treated block was insoluble in boiling water, fire-resistant, heat transmission-retardant and dimensionally stable suitable for use in building construction and the like.

EXAMPLE 3

A lightweight composition particularly suitable for thermal and sound insulation was prepared by mixing one part gypsum to 22 parts particulate synthetic silicate-based material having the same makeup as that used in Example 1 above. The resulting mixture was mixed with sufficient water to render it workable and moldable, and it was cast into a solid block. After the block dried, it was subjected to heat at high temperatures in a furnace for a length of time sufficient to render the heat-treated block insoluble in boiling water.

EXAMPLE 4

Four parts gypsum were mixed with one part powdered synthetic silicate-based material and then sufficient water was mixed in to render the composition workable and moldable. The wet composition was cast into a block. After the block dried into a rigid block, it was placed in a furnace and was heated at high temperatures for a period of time. A fire-resistant and heat transmission retardant material capable of maintaining its structural integrity under adverse heat conditions was obtained.

EXAMPLE 5

Gypsum binder and particulate synthetic silicate-based material were pre-mixed in proportions ranging from one part gypsum to one to 22 parts synthetic silicate-based material having a composition as set forth in Example 1. The particulate synthetic material was slightly moistened prior to mixing to prevent segregation and to cuase the gypsum binder to adhere to the surface of the particles. The resulting composition was then applied to a surface by a "Gunite" application system by ejecting the composition at high velocity from a nozzle with water being introduced at the nozzle so as to wet the composition into a thick slurry as it was sprayed from the nozzle to coat the surface. The surface was then subjected to heat at a temperature above 1,000° F and preferably between 1,200° to 1,400° F. At 1,000° F the coating had an appearance noticably different from ordinary gypsum.

Application according to this method is an excellent means of using the composition as a furnace lining capable of being converted into a refractory by heat setting and heat treating it in situ by firing in a furnace.

Application according to this "Gunite" method is an excellent manner of using the novel composition of this invention to coat steel columns and girders in a building with a protective layer which hardens in place and adheres to the underlying steel. In the event that a fire should occur in the building, the protective layer resists the fire and retards the heat so as to prevent the basic steelwork in the building from being damaged or weakened. Moreover, the protective layer on the steel becomes stronger as a result of the occurrence of fire in the buildings.

EXAMPLE 6

A compression test was made comparing a cube fabricated from the composition of this invention with cubes made from gypsum combined with other aggregate materials. Specimens were made using gypsum combined with (a) vermiculite of somewhat less than 1/16 inch average size, (b) concrete sand and (c) synthetic silicate-based aggregate of somewhat less than 1/16 inch average diameter. All mixes were in the proportion of 1 part gypsum to 3 parts aggregate by volume and formed into two-inch square cubes. One batch of specimens were subjected to normal curing, only, by maintaining them overnight in an oven at 150° F. The other group of specimens were subjected to high temperatures in a muffle furnace after normal curing. Conditions in the muffle furnace were controlled to slowly increase the temperature to 1,900° F and maintaining it at that level for 1 hour and then slowly decreasing it to ambient again. The results of the tests are given in Tables 1 and 2 and confirm that the composition of the present invention has unusual dimension stability and structural properties which give it greatly increased strength as well as heretofore unobtainable structural integrity and resistance against disintegration.

EXAMPLE 7

A wallboard 2¼ inches thick was prepared using a composition made by mixing one part gypsum by volume to 10 parts synthetic lightweight aggregate having the composition set forth in Example 1 (as high as 20 parts synthetic may be advantageously used) plus a minor amount of water. One face of the board was heated by an electric furnace, starting at an initial furnace temperature of 1,200° F and increasing to a temperature of 2,150° F in 6 hours (roughly following the ASTM furnace temperature curve) while the ambient temperature was 80° F. The wallboard specimen did not fail, according to the New York Building Code test until after 5¾ hours thus exceeding by far the Two-hour and Four-hour standard rating.

EXAMPLE 8

Equal parts of gypsum and magnesium oxysulfate were combined and mixed with six parts of synthetic silicate-based aggregate, based on total binder, and fashioned into a 1 inch thick wallboard in accordance with the procedures set forth above.

Specimens of the wallboard were assembled so as to provide a "wall" specimen to two 1-inch thick shells separated by a cavity of 1-inch thickness giving an overall thickness of 3 inches. Subjected to intense heating in front of an electric muffle furnace, starting at an initial furnace temperature of 1,200° F and increasing to a temperature of 2,150° F in 6 hours (roughly following the ASTM furnace temperature curve), the non-heated surface of the wallboard never rose to a temperature of more than 150° above the ambient although the test was run continuously for 8 hours.

Thus, the wallboard never "failed" when one considers that a New York City Building Code categorizes a failure as occurring only when a temperature of the outer face rises to 250° above ambient. The outer face of the wall containing the composition of this invention stayed 100° away from failure for a total of 8 hours.

EXAMPLE 9

A composition having equal parts of gypsum and magnesium oxysulfate combined with six parts of synthetic silicate-based aggregate for each part of total binder was cast into a test specimen measuring 3½ inches by 4 ⅛ inches by 3¼ inches. A thermocouple was cast into the specimen so as to be embedded therein at a location 2½ inches from the specimen face to be subjected to intense heat.

The specimen was exposed to a muffle furnace to temperature beginning at 1,200° F and ranging up to 2,150° F, the furnace limit, after 6–8 hours. After 8 hours of exposure the specimen thermocouple registered 180° F below failure and the test was stopped.

A similar specimen identical except that the binder was entirely gypsum failed after 5½ hours. Thus the combination of gypsum and magnesium oxysulfate substantially increased fire resistance.

It is to be noted that a magnesium oxysulfate-gypsum binder composition specimen prepared as set forth above has undergone repeated relative humidity cycling tests without any loss of integrity over a period of months.

EXAMPLE 10

Gypsum was combined with synthetic silicate-based aggregate in the ratio of 1:6 and formed into a 1-inch wallboard as described above. Two wallboards were assembled with a space of 1 inch therebetween to obtain a "wall" specimen having an overall thickness of 3 inches. This specimen was fire tested in front of a muffle furnace and did not fail until after 5 hours.

A similar specimen but containing glass fibers did not fail until 5 ¾ hours.

There has been provided compositions having enhanced fire resistant and heat transmission retardant properties which are suitable for the fabrication of all types of building and construction materials by they wallboard, ceiling tiles, blocks, girder sheathing, beam covering, spray on or solid thermal and sound insulation or the like. The compositions find use also in industrial applications and as a refractory lining for furnaces. Another advantage is the extreme lightweight of the compositions and the controllability of their density. The material not only finds use in every manner in which gypsum alone finds use today but in many other applications where either engineering or economic considerations or safety do not permit the use of gypsum or other currently available materials such as insulating materials and the like.

TABLE I

Compression Tests After Overnight Curing at 150°F

| Specimen | Specimen Weight (Grams) | Compression Force (PSI) | Observed Failure |
|---|---|---|---|
| gypsum vermiculite | 74.1 | 15 | powdered |
| gypsum vermiculite | 73.1 | 18 | powdered |
| gypsum-synthetic aggregate | 68.8 | 318 | shear break |
| gypsum-synthetic aggregate | 68.6 | 308 | shear break |
| gypsum-concrete sand | 225.5 | 659 | shear break |
| gypsum-concrete sand | 224.4 | 653 | shear break |

TABLE 2

Compression Tests After Chemical Curing at 150°F Followed By Furnace Curing at 1900°F

| Specimen | Specimen Weight (Grams) | Compression Force (PSI) | Observed Failure |
|---|---|---|---|
| gypsum vermiculite | 74.1 | 1.7 | powdered |
| gypsum vermiculite | 73.1 | 1.0 | powdered |
| gypsum-synthetic aggregate | 68.8 | 642 | shear break |
| gypsum-synthetic aggregate | 68.6 | 712 | shear break |
| gypsum-concrete sand | 225.5 | 1.0 | powdered |
| gypsum-concrete sand | 224.4 | .8 | powdered |

What is claimed is:

1. A fire-resistant composition suitable for use in construction materials such as wallboard, insulation, soundproofing, fireproofing, furnace lining and building products or the like and exhibiting increased strength and structural integrity when subjected to temperatures in excess of 400° F. up to 2,000° F. consisting essentially of 1 part, by volume, gypsum, and 1 to 22 parts, by volume, of a silicate-based synthetic lightweight aggregate material having a bulk density of 1.4 to 6 pounds per cubic foot and comprising a heat-expanded mixture of anhydrous sodium silicate, liquid sodium silicate and a heat-triggered neutralizer material.

2. A fire-resistant composition suitable for use in construction materials such as wallboard, insulation, soundproofing, fireproofing, furnace lining and building products or the like and exhibiting increased strength and structural integrity when subjected to temperatures in excess of 400° F. up to 2,000° F. consisting essentially of gypsum, magnesium oxysulfate and a silicate-based synthetic lightweight aggregate material having a bulk density of 1.4 to 6 pounds per cubic foot and comprising a heat-expanded mixture of anhydrous sodium silicate, liquid sodium silicate and a heat-triggered neutralizer material.

3. A fire-resistant composition as claimed in claim 2 wherein the gypsum and magnesium oxysulfate are combined by volume in the ratio of 1 part gypsum to 1 part magnesium oxysulfate and the synthetic material is combined by volume in the ratio of 6 parts synthetic material to each part of combined gypsum and magnesium oxysulfate.

4. A fire-resistant composition as claimed in claim 1 wherein the synthetic material also contains Portland cement.

* * * * *